United States Patent [19]

Frazee, Jr. et al.

[11] Patent Number: 4,553,706
[45] Date of Patent: Nov. 19, 1985

[54] LIGHTGUIDE FIBER SPOOL CHANGEOVER TECHNIQUE

[75] Inventors: Ralph E. Frazee, Jr., Brick Township, Ocean County; David H. Smithgall, Sr., East Windsor Township, Mercer County, both of N.J.

[73] Assignee: AT&T Technologies, Inc., Berkeley Heights, N.J.

[21] Appl. No.: 623,900

[22] Filed: Jun. 25, 1984

[51] Int. Cl.[4] ......................................... B65H 67/056
[52] U.S. Cl. .................. 242/18 A; 242/25 A
[58] Field of Search ............... 242/18 A, 25 A, 7.09

[56] References Cited

U.S. PATENT DOCUMENTS

| | | | |
|---|---|---|---|
| 1,393,286 | 10/1921 | Hosford | 242/25 A |
| 1,807,199 | 5/1931 | Dear | 242/25 A X |
| 2,296,339 | 9/1942 | Daniels | 242/18 A X |
| 2,622,810 | 12/1952 | Stream et al. | 242/18 A |
| 2,663,507 | 12/1953 | Soussloff | 242/18 A |
| 2,930,536 | 3/1960 | Stalhuth | 242/25 A |
| 2,932,461 | 4/1960 | Kimberly | 242/18 A |
| 3,109,602 | 11/1963 | Smith | 242/18 A |
| 3,318,541 | 5/1967 | Genson | 242/18 A |
| 3,329,361 | 7/1967 | Gonquet | 242/25 A |
| 3,345,003 | 10/1967 | Mattingly et al. | 242/18 A |
| 3,596,844 | 8/1971 | Engmann | 242/25 A |
| 3,693,896 | 9/1972 | Brauweiler et al. | 242/18 A |
| 3,994,444 | 11/1976 | List et al. | 242/18 A |
| 4,195,791 | 4/1980 | Frazee, Jr. | 242/45 |

FOREIGN PATENT DOCUMENTS 641335  5/1962  Canada .................. 242/18 A

*Primary Examiner*—Stanley N. Gilreath
*Attorney, Agent, or Firm*—D. J. Kirk

[57] ABSTRACT

A technique for dynamically changing from a full, rotating spool (18) of lightguide fiber (10) to an empty spool (19) while maintaining a substantially constant feed velocity is described. The fiber (10) is moved along a tapered transition section (40 or 52) having a continually decreasing cross-sectional diameter as the spools (18 and 19) and the transition section (40 or 52) rotate at the same velocity. The rotational velocity of the spools and the transition section are increased as the fiber is wound therealong. The fiber is transferred from the transition section onto the empty spool.

8 Claims, 6 Drawing Figures

LIGHTGUIDE FIBER SPOOL CHANGEOVER TECHNIQUE

TECHNICAL FIELD

This invention relates to methods and apparatus for collecting lightguide fiber onto spools. In particular, the invention is directed to techniques for dynamically changing from a full spool to an empty spool.

BACKGROUND OF THE INVENTION

In fabricating lightguide fiber for communication purposes, it is well known to position a cylindrical glass preform in an open-ended furnace in order to form a melt zone at an end of the preform. A lightguide fiber is then pulled from the melt zone, by a drawing device, and is further gathered onto a rotating take-up spool. There is a fiber catenary between the drawing motor and the take-up spool to permit the collection of the fiber at a low tension in order to minimize damage to the fiber or any coating thereon and to make accurate optical measurements.

Such a technique requires that a relationship exist between the rim velocities of the drawing and the take-up devices so that the initial sag placed in the fiber catenary between the two devices does not substantially change in depth during the fiber drawing-collecting process. This may be readily accomplished by a catenary controller described in detail in U.S. Pat. No. 4,195,791 which issued on Apr. 1, 1980 to R. E. Frazee which is assigned to the instant assignee and is hereby incorporated by reference herein. The catenary controller of the Frazee patent uses a closed circuit television (CCTV) camera to monitor the sag of the fiber between the drawing device and the take-up spool. The output from the CCTV camera is forwarded to a video signal processor which continuously determines the displacement of the lowest point of the fiber catenary loop from an optimum position and generates an electrical signal proportional thereto. The electrical signal is forwarded to a spooling motor to adjust the speed of the take-up spool to cause the fiber catenary to return to a predetermined position.

Such a technique has been found to be most effective for maintaining the position of the catenary loop within the predetermined limits which desirably results in low take-up tension. However, problems arise when it is necessary to change from a full take-up reel to an empty take-up reel as the fiber continues to be drawn because the catenary loop tends to fall outside the field of view of the CCTV camera at that time. This results in the loss of control of the spooling process with the attendant loss of fiber.

Presently such a transfer is accomplished by placing an empty spool proximate the full spool and in axial alignment therewith in such a manner that both spools rotate at the same velocity. When the transfer from the full to empty spool occurs, a substantially constant tangential velocity of the fiber must be maintained, and therefore a nearly instantaneous change in angular velocity of the take-up spool must occur. It has been calculated that at a draw speed of one meter per second the catenary control circuitry has one second to change the angular velocity of the take-up motor to maintain control. However, at five meters per second the dynamic response of the system must be such that the adjustment is made in less than 0.2 second.

It has been empirically determined that with an operator assisting, transfers from full to empty spools can be reliably accomplished at fiber draw speeds up to at least two meters per second while maintaining the catenary loop within the field of view of the CCTV camera. Successful transfers become more difficult to achieve as the draw speed increases and are virtually impossible at draw speeds much above three meters per second.

Accordingly, there is a need for dynamically transferring a lightguide fiber from a full to an empty reel at high speed with reliable control while spooling the fiber at a constant velocity.

SUMMARY OF THE INVENTION

The foregoing problem is overcome by the instant method for dynamically changing from a full spool of strand material to an empty spool while both spools are rotating at the same velocity and the input velocity of the strand material remains substantially constant. The method comprises the steps of winding the strand along a transition section rotating at the same velocity as the full and empty spools, which has a decreasing cross-sectional diameter; simultaneously increasing the rotational velocity of the spools and the transition section as the strand is wound along the transition section; and transferring the strand onto the empty spool from the transition section.

DETAILED DESCRIPTION

Figure 1:
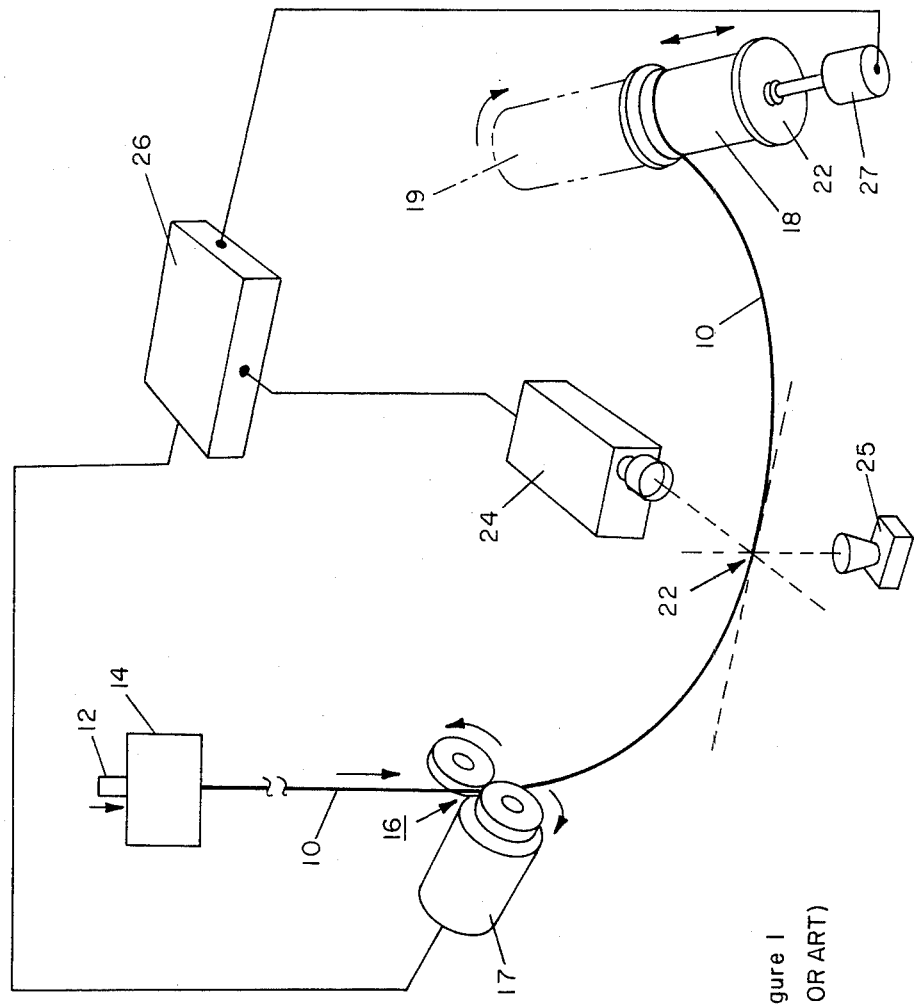
FIG. 1 is an isometric view of a lightguide drawing and control apparatus.

It is well known to draw a strand of lightguide fiber 10 from a glass preform 12 that is heated to an elevated temperature in a furnace 14 as shown schematically in FIG. 1. A drawing mechanism 16, controlled by a motor 17, pulls the fiber 10 from the preform 12 which is then wound onto a take-up spool 18. The spool 18 is typically six inches in diameter with eight inch diameter flanges 22 and four inches between flanges, and has a capacity of approximately 10 km of fiber.

The take-up spool 18 is separated from the fiber drawing mechanism 16 during the fiber drawing as shown in FIG. 1, and the fiber 10 passes between them as a catenary loop 22. The loop 22 is maintained at a predetermined sag depth by using a CCTV camera 24 to monitor the height of the catenary loop which is illuminated by a lamp 25. A catenary control circuit 26, described in detail in the aforementioned Frazee patent, regulates the position of the fiber 10 by synchronizing the tangential velocity of the spool 18 to the fiber draw speed. As the fiber 10 accumulates on the spool 18, the effective diameter of the spool increases. In order to maintain a constant spooling speed, the angular velocity of the spool 18 is decreased by a signal forwarded to a spooling motor 27 from the catenary control circuit 26.

As a spool 18 is filled, collection is transferred to an empty spool 19 (shown in phantom) which is placed axially adjacent to the full spool.

When it becomes necessary to dynamically transfer the fiber 10 from a full spool 18 to an empty spool 19, a constant fiber input velocity must be maintained, and therefore, a nearly instantaneous change in angular velocity of the rotating take-up reels 18 and 19 must occur. It has been mathematically determined that at a draw speed of 1 m/s, the catenary control circuitry 26 has one second to change the angular speed of the take-up motor 27 to maintain control. At 5 m/s, however, the dynamic response of the system must be such that adjustment is made in less than 0.2 second.

With an operator assisting, transfers from the full spool 18 to an empty spool 19 can be reliably accomplished at draw speeds up to at least 2 m/s. However, successful transfers become more difficult to achieve as draw speed of the fiber 10 increases and are virtually impossible at draw speeds much above 3 m/s. Furthermore, it is undesirable for the operator to be involved in the transfer operation under any circumstances.

Figure 2:
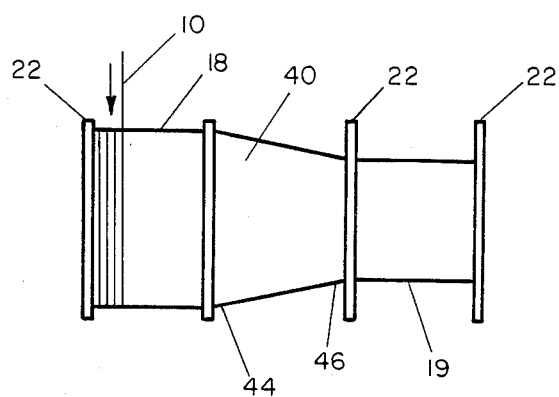
FIG. 2 is a side view of a tapered transition member mounted between full and empty spools.

The foregoing problem has been overcome by the apparatus shown in FIG. 2. A tapered transition member 40, having a decreasing cross-sectional diameter, is positioned between the full spool 18 and the empty spool 19. The spools 18 and 19 and the member 40 are arranged to simultaneously rotate at the same velocity. The first end 44 of the tapered transition member 40 has a diameter equal to that of the full spool while the other end 46 of the member 40 has a diameter equal to that of the empty spool 19. The reeled fiber 10 moves from the full spool 18 across the tapered transition member 40 and onto the empty spool 19. Simultaneously, the position of the catenary 22 is maintained within the field of view of the CCTV camera 24 by a coordinated decrease in the speed of the spooling motor 26 in a controlled fashion.

Fiber Package Design

Figure 3:
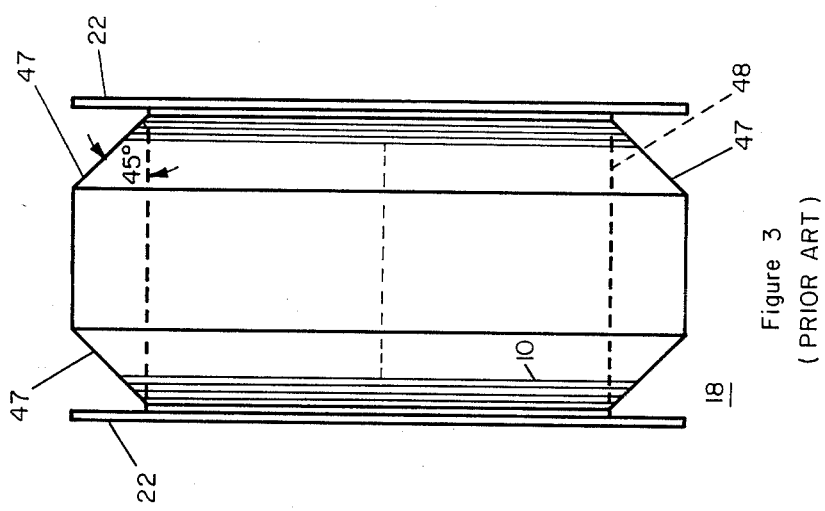
FIG. 3 is a side view of a known lightguide filled fiber spool.

If a four inch wide spool were filled from a six inch base diameter to the eight inch flange diameter, it could hold approximately 13.5 km of the fiber 10 assuming a 65% packing density. It has been the practice in the past, however, to wind the fiber 10 on the core 48 in such a manner as to taper the outboard portions 47—47 of the fiber package on the reel by 45° (see FIG. 3). The capacity of the four inch spool with this design is approximately 10 km. This dual tapered design has been found to have a slight disadvantage in that when the full spools 18 are stored on their sides, there is a slight tendency for the coils on the outboard portions 47—47 to become loose. However, it has been discovered that such a taper can be used to advantage during the transfer operation by providing a transition region over which a controlled change in the speed of the take-up motor 26 can be achieved as the effective spool diameter changes from the full spool diameter to the empty spool diameter.

Figure 5:
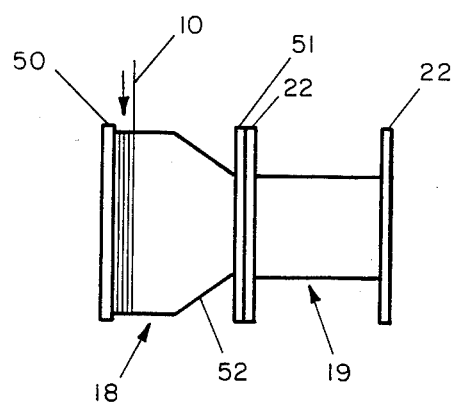
FIG. 5 is a side view of a tapered spool package adjacent an empty spool.
Figure 4:
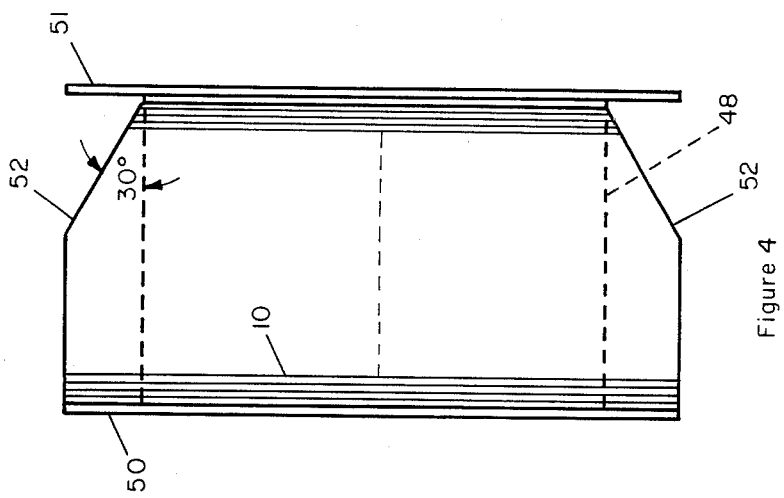
FIG. 4 is a side view of an improved lightguide filled fiber spool.

The instant fiber package design is described in co-pending U.S. patent application Ser. No. 623,881 entitled "Lightguide Fiber Spool Changeover Technique" to R. E. Frazee, D. L. Meyers and D. H. Smithgall filed on June 25, 1984 and assigned to the present assignee. FIGS. 4 and 5 show the package which uses a flange 50 as one edge and has a taper towards the other flange 51 of the reel. This design offers a tapered transition region 52 for the spooling transfer operation.

It was found that for a fast transition over the tapered region 52, i.e., three to four seconds to cross the region, the fiber 10 lays on the taper with no difficulty for angles of 30° and 45°. There was a slight back tension applied to the fiber 10 as it was pulled through a guide of two felt strips (not shown) with a few grams pressure. The transition was performed several times, building up successive layers of fiber 10, and no difficulty in package integrity was found.

The transition was also tried at the standard translation rate, which took 30 seconds to cross the transition region 52. For this rate, the package on a 30° taper maintained its integrity. However, the 45° taper produces a less stable wind and with the transition procedure and speed is considered to be only marginally acceptable.

Electronic Compensation

In principle, an electronic control signal which decreases the speed of the take-up motor 27 with fiber length (i.e., diameter of the spool 18 with fiber 10) and then increases through the tapered transition region 40 of FIG. 2 or 52 of FIG. 4 is required.

The prior art control signal to the take-up motor 27 is the sum of two signals. The nominal control is simply proportional to the draw speed of the fiber 10. The signal from the catenary feedback control circuit 26 is proportional to the offset of the catenary from the center of the field of view of the CCTV camera 24. In effect, this feedback signal is the integral of velocity offset. If the nominal speed ratio signal is set for an empty spool 18 such that the feedback signal controls about zero offset, then as the fiber 10 accumulates on the package, a non-zero offset is required to generate the change in rotational speed of the take-up motor 27. The offset is directly proportional to the length of the fiber 10 and the draw speed, and inversely proportional to control loop gain. For a stable control loop, a top draw speed on the order of about 2.5 m/s tends to create an offset which moves the catenary outside the field of view of the CCTV 24. An increase in control gain reduces the offset, but decreases the stability of the control of the catenary loop 22. Thus, there is an increased probability that a disturbance to the loop 22 will result in a complete loss of control.

Using a feedback control scheme only, a gain setting which provides adequate dynamic response during the transition along the tapered region 40 or 52, is only marginally dynamically stable. It has been found that relatively small disturbances to such a configuration result in complete loss of speed control. On the other hand, a gain configuration which provides adequate stability to process disturbances loses control during the rapid transition.

This dynamic instability, coupled with the size of the offset resulting from the package diameter increase results in an inadequate design when feedback control alone is used.

An effective control circuit has been designed using certain known parameters. The first known parameter is that the diameter of the fiber 10 on the spool 18 is approximately proportional to the length of the fiber on the spool, and an odometer or counter circuit can be used to generate a ramped control signal during the collection of the fiber. The second known parameter is that spool transfer occurs when a desired length of the fiber 10 has been collected (a known point) and the transition from the full package diameter to the empty spool diameter will occur in a fixed time interval at a constant rate. In effect, the circuit is a dual rate integrator, but with no phase lag.

Figure 6:
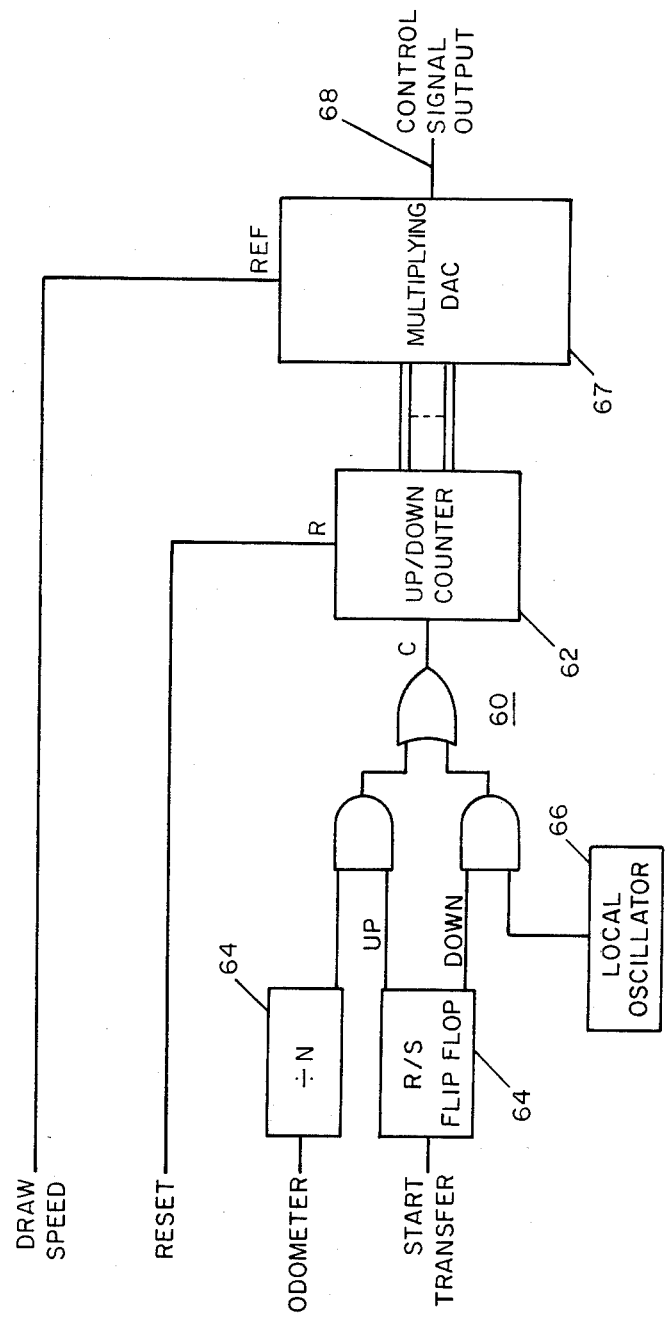
FIG. 6 is a block diagram of a lightguide fiber take-up compensator circuit.

The block diagram for such a circuit 60, which is packaged with the catenary control circuit 26 (see FIG. 1), is shown in FIG. 6. The accumulated signal is generated on an 8-bit up/down counter 62. The counter 62 is reset from an external source as the fiber 10 begins to collect on an empty spool 19. An R-S flip-flop 64 simultaneously gates in the up-counting clock rate derived from an external pulse train of one pulse per meter of the fiber 10. A divide by N circuit 64 determines the clock rate into the counter 62. When the desired length of the fiber 10 has been accumulated on the spool, an external start transfer pulse changes the state of the R-S flip-flop 64 at the point where the tapered transition region begins. The counter 62 is then down-counted to zero by a local oscillator 66.

The output from the counter 62 is multiplied by the DAC 67 to produce a control signal output 68. The signal output 68 is proportional to the product of the draw speed and fiber length, thus cancelling the offset in the catenary position resulting from the change in fiber package diameter.

There are three aspects of this circuit design which must be tailored to the draw system and spool design. The first is the desired transition time from full to empty spool diameter. An initial time of four seconds was selected, but this may be changed by adjusting the frequency of the local oscillator 66 with a trim potentiometer (not shown).

The second aspect of the design is the divide by N circuit 64 for counting during fiber accumulation. The value of N depends upon the resolution of the pulse train from the odometer, and is selected such that the counter has a maximum count when the collection spool is filled.

The third aspect of the design is the adjustment of control loop gain. Output 68 gain from this circuit is adjusted on a voltage divider potentiometer (not shown) which is adjusted such that zero catenary position offset is maintained as the fiber 10 is accumulated on the spool.

The combination of a transition region 40 or 52 and an electronic circuit will permit the transfer of the fiber 10 from full 18 to empty spools 19 at high draw speeds. Both the transition member 40 and the new package design shown in FIG. 4, which uses the flange 50 for one edge and a tapered section 52 with an approximately 30° angle for the other edge provides a stable configuration for high speed transfer. Additionally, the new package design provides approximately the same fiber capacity as the previously used package and may enhance subsequent storage, handling and unwinding operations.

Advantageously, providing the taper 52 as a part of the wound spool winding design provides an alternative to a separate transition section 40 and substantially reduces the complexity of the take-up equipment.

It is to be understood that the embodiments described herein are merely illustrative of the invention. Various modifications may be made thereto by persons skilled in the art which will embody the principles of the invention and fall within the spirit and scope thereof.

What is claimed is:

1. A method for dynamically transferring a strand of material from a full, rotating, take-up spool of strand material to an empty, rotating, take-up spool, axially aligned therewith, comprising the steps of:
   delivering the strand to a take-up spool at a substantially constant linear velocity to fill said spool;
   rotating the full and empty spools along with a tapered transition section axially interposed therebetween, at the same rotational velocity;
   winding the strand along the tapered section, from the greater to the smaller cross-sectional diameter thereof, while simultaneously increasing the rotational velocities of the spools and the tapered transition section; and
   transferring the strand from the tapered transition section onto the empty spool when the strand is at the diameter of the taper equal to the diameter of the empty spool.

2. The method as set forth in claim 1, wherein:
   the transition section is axially interposed between the full and empty reels.

3. The method as set forth in claim 2, wherein:
   the tapered transition section is a frusto-conical member.

4. The method as set forth in claim 1, wherein:
   the strand material is lightguide fiber.

5. An apparatus for dynamically transferring a strand of material from a full, rotating, take-up spool of strand material to an empty, rotating, take-up spool, axially aligned therewith, comprising:
   means for delivering the strand to a take-up spool at a substantially constant linear velocity to fill said spool;
   a tapered transition member axially interposed between the full and empty spools;
   means for rotating the full and empty spools and the tapered transition member at the same rotational velocity;
   means for winding the strand along the tapered transition member from the greater to the smaller cross-sectional diameter thereof, while simultaneously increasing the rotational velocities of the spools and the tapered transition member; and
   means for transferring the strand from the tapered transition member onto the empty spool when the strand is at the diameter of the taper equal to the diameter of the empty spool.

6. The apparatus as set forth in claim 5, wherein:
   the transition member is axially interposed between the full and empty reels.

7. The apparatus as set forth in claim 6, wherein:
   the tapered transition member is a frusto-conical member.

8. The apparatus as set forth in claim 5, wherein:
   the strand material is lightguide fiber.

* * * * *